United States Patent
Bauer et al.

(10) Patent No.: US 7,091,873 B2
(45) Date of Patent: Aug. 15, 2006

(54) DEVICE AND METHOD FOR DETECTING THE OCCUPATION OF A SEAT IN A MOTOR VEHICLE

(75) Inventors: Peter Bauer, Regensburg (DE); Manfred Geyer, Regensburg (DE); Michelle Homann, Shelby Township, MI (US); Henderikus-L Offereins, Langquaid (DE)

(73) Assignee: Siemens Aktiengesellschaft, Munich (DE)

( * ) Notice: Subject to any disclaimer, the term of this patent is extended or adjusted under 35 U.S.C. 154(b) by 72 days.

(21) Appl. No.: 10/482,376

(22) PCT Filed: Jun. 27, 2002

(86) PCT No.: PCT/DE02/02353

§ 371 (c)(1),
(2), (4) Date: Sep. 21, 2004

(87) PCT Pub. No.: WO03/004318

PCT Pub. Date: Jan. 16, 2003

(65) Prior Publication Data

US 2005/0043875 A1     Feb. 24, 2005

(30) Foreign Application Priority Data

Jul. 2, 2001     (DE) ................. 101 31 954

(51) Int. Cl.
*G08B 21/00* (2006.01)

(52) U.S. Cl. .................... 340/667; 340/666; 340/438

(58) Field of Classification Search .............. 340/438, 340/507, 573.1, 561, 562, 666, 667; 29/857; 701/45, 47, 49; 180/273; 280/730.1, 735
See application file for complete search history.

(56) References Cited

U.S. PATENT DOCUMENTS

| | | | | |
|---|---|---|---|---|
| 5,570,903 A | * | 11/1996 | Meister et al. | 280/735 |
| 5,842,314 A | * | 12/1998 | Porter | 52/309.7 |
| 6,490,515 B1 | * | 12/2002 | Okamura et al. | 701/49 |
| 6,643,925 B1 | * | 11/2003 | Ormachea et al. | 29/857 |

FOREIGN PATENT DOCUMENTS

| | | |
|---|---|---|
| DE | 198 02 099 A1 | 7/1998 |
| DE | 200 14 200 U1 | 1/2001 |
| EP | 0 895 091 A2 | 2/1999 |
| JP | 2000-275115 | 10/2000 |

OTHER PUBLICATIONS

K. Billen et al., "Occupant Classification System for Smart Restraint Systems," Society of Automotive Engineers, Inc., 1999.

* cited by examiner

*Primary Examiner*—Van T. Trieu
(74) *Attorney, Agent, or Firm*—Morrison & Foerster LLP

(57) ABSTRACT

The invention relates to a device and method for detecting the occupation of a seat in a motor vehicle. The device comprises first sensor elements (SE1), which are flatly arranged on the seat surface of a vehicle seat and are part of a first sensor seat mat (OCSM) for measuring the weight or a weight profile on the vehicle seat. The device also comprises an evaluating unit, which is connected down from the sensor elements and provided for evaluating the first sensor signals of the first sensor seat mat (OCSM). The inventive device comprises additional safety sensor elements (SE2), which are flatly arranged on the seat surface of the vehicle seat, likewise connected to the evaluating unit, and provided for testing the operability of the first sensor elements (SE1). The inventive device is used in a method for detecting the occupation of a seat in a motor vehicle during which a control unit of an occupant protection system adapts the triggering behavior of an occupant protection to the determined occupation of the seat when the safety sensor elements (SE2) confirm the weight and/or the weight distribution established by the sensor seat mat (OSCM).

10 Claims, 2 Drawing Sheets

DEVICE AND METHOD FOR DETECTING THE OCCUPATION OF A SEAT IN A MOTOR VEHICLE

CLAIM FOR PRIORITY

This application is a national stage application of International Application No. PCT/DE02/02353 which was published in the German language on Jan. 16, 2003 and which claims the benefit of priority to German Application No. 101 31 954.1, which was filed in the German language on Jul. 2, 2001.

TECHNICAL FIELD OF THE INVENTION

The invention relates to a device and a method for detecting whether a seat is occupied in a motor vehicle.

TECHNICAL FIELD OF THE INVENTION

In a plurality of technical applications in motor vehicles, the occupation of seats by vehicle occupants is an important input variable. This applies particularly to occupant restraining systems, the efficient use of which is often dependent on the sitting position of the vehicle occupants. In order to detect the occupation of seats in motor vehicles, use is made of so-called sensor seat mats, which comprise a number of pressure-sensitive sensor elements. These elements are arranged such that they are distributed over the surface of a vehicle seat and can thus detect pressure applied on the seat surface by a person or an object.

Occupant detection systems which use such sensor seat mats are known as Occupation Classification Systems (OCSs). Such an OCS is described, for example, in document DE 200 14 200 U1 and in the article "Occupation Classification System for Smart Restraint System" from the Conference Proceedings of the Specialist Conference Airbag 2000+, 30 November to 2 Dec. 1998 in Karlsruhe, Germany, ISSN 0722-4087.

In an area particularly preferred for a subsequent evaluation, there is an extensive linear relationship between the weight force applied and the electrical resistance reading from the signal-generating sensor elements, which reading is dependent thereon. The variable resistance readings are converted into sensor signals by the sensor elements.

By evaluating the sensor signals in an evaluating unit of the OCS, a seat profile is generated, by which the sitting position of a vehicle occupant, and also of objects that have been placed on the seat, is deduced.

Depending on the seat occupation that is detected, the triggering parameters of an occupant restraining means are optionally adapted by the control unit of the vehicle protection system such that optimum protection is guaranteed for the vehicle occupant according to his respective sitting position. In such systems, it may be necessary under certain circumstances for the triggering of an occupant restraining means, such as an airbag for example, to be completely suppressed if, for example, a vehicle occupant is too close to the occupant restraining means (airbag) that is meant to be activated.

When an OCS is used as an occupant detection system, the probability of a malfunction occurring must be kept as low as possible since, in the case of a malfunction of the occupant detection system (OCS), there is danger of serious injury occurring to the vehicle occupant who is meant to be protected. For example, an unnoticed increase in the resistivity in the path of the current to the sensor elements of the sensor seat mat of the OCS can possibly seriously distort the resistance readings for the sensor elements, as a result of which the evaluating unit of the OCS detects an incorrect weight signal for a vehicle occupant, thus taking an incorrect result as the basis for the triggering strategy of the occupant detection system.

The weight that is incorrectly determined in the above way for a vehicle occupant or even the incorrect classification of the occupant, as a particularly heavy or tall person for example, could lead to the control unit of the occupant protection system triggering an airbag for the supposed protection of the occupant even if it is more likely to harm the vehicle occupant who is actually sitting on the vehicle seat. Likewise, an incorrect classification as a particularly light or small person could also prevent the triggering of an airbag although this would if necessary protect the occupant from injuries in case of an accident.

The above observation shows how reliable and precise the OCS has to be to detect the sitting position of a passenger in order for the system to be operated safely in the context of an occupant protection unit in a motor vehicle.

SUMMARY OF THE INVENTION

The object of the present invention is therefore to create a device for occupant detection in a motor vehicle, in which device the signals from the occupant detection system can be checked for accuracy.

The invention relates to a device and a method for detecting whether a seat is occupied in a motor vehicle, having, flatly arranged on the seat surface of a vehicle seat, first sensor elements for detecting the occupation of the motor vehicle seat, the first sensor elements being arranged in particular inside a first sensor seat mat (OCSM) and the sensor signals of the first sensor elements being dependent on the weight force applied thereon, having an evaluating unit downstream from the first sensor elements for evaluating the signals from the first sensor elements, the so-called sensor signals, and a control unit downstream from the evaluating unit to adapt the triggering parameters of an occupant restraining unit, such as an airbag, depending on the evaluated first sensor signals. The device according to the invention is for detecting the occupation of a seat in a motor vehicle and comprises sensor elements flatly arranged on the seat surface of a vehicle seat, in particular sensor elements inside a first sensor seat mat. The sensor elements of the first sensor seat mat, also subsequently referred to as first sensor elements, convert into electrical signals a weight force applied on them by a vehicle occupant or object.

The evaluating unit, which receives the signals from the sensor elements, subsequently carries out an evaluation of the sensor signals resulting in classification of the weight acting on the seat. Depending on the respective type of sensor elements used in the sensor seat mat, in the most straightforward instance a weight classification can contain an 'occupied/not occupied' statement, but it can also contain a classification according to weight, for example by differentiating between light, medium-weight or very heavy persons or there is even a subsequent classification according to the weight distribution on the vehicle seat. Such a classification can distinguish, for example, between shapes of the buttocks or weight displacements. For example, a very tall and thin person can be distinguished from a fat person by the shape of the buttocks, just as a forward displacement of any person can be distinguished by the irregularly loaded seat surface.

The weight information that is classified in the above way is transferred to the control unit of an occupant restraining unit, the control unit being downstream from the evaluating unit. The control unit of the occupant restraining unit, for example an airbag, takes into account the result of the classification of the weight information from the evaluating unit in an optionally modified triggering strategy of the occupant restraining unit, such as an airbag.

According to an aspect of the invention, the result of the classification effected by the evaluating unit, the sensor signals from further safety sensor elements likewise arranged on the seat surface of the vehicle, the so-called second sensor signals, are now accessed for the purpose of checking. The signals from the safety sensor elements are also transmitted to the evaluating unit. The safety sensor elements, depending on the design thereof, also allow classification of the object located on the vehicle seat according to the weight or weight distribution thereof.

The evaluating unit can now compare the result from the weight classification effected by the sensor signals from the safety sensor elements with the result of the classification of the first sensor elements of the first sensor seat mat. Dissimilar results from the two classifications indicate that there is a malfunction of either the first sensor elements or of the safety sensor elements, which can lead to the control unit failing to modify the triggering of the occupant restraining unit or carrying out the modification of the triggering parameters only in such an attenuated form that a vehicle occupant is not exposed to the unnecessary risk of injury from the airbag.

According to an aspect of the invention, the safety sensor elements can be flatly arranged on the vehicle seat inside a second sensor seat mat above or below the first sensor seat mat.

According to another aspect of the invention, the two sensor seat mats can be bonded together. This prevents the first sensor elements from slipping with respect to the safety sensor elements, an event that must be avoided particularly when individual sensor elements of the first and second sensor seat mat are each monitoring the situation alone.

According to a further aspect of the invention, the safety sensor elements can be arranged integral with the first sensor seat mat. For example, the first sensor elements and the safety sensor elements can have essentially the same structural design and be arranged adjacent to one another.

According to a further aspect of the invention, each respective safety sensor element can serve for monitoring the correct functioning of at least one first sensor element or even of a plurality of first sensor elements, which are preferably arranged adjacent to one another.

According to yet another aspect of the invention, one safety sensor element can be assigned to each first sensor element, with the result that each individual first sensor element can be monitored individually. The advantage of such an arrangement of first sensor elements and safety sensor elements with respect to one another is that a malfunction of an individual first sensor element is even detected by the safety sensor element assigned thereto, with the result that, when the remaining first sensor elements are functioning correctly, it is only these elements that contribute to the adapting of the triggering strategy of the control unit of the occupant restraining unit. The signals from the defective first sensor element on the other hand are simply ignored.

Where the first sensor elements and the safety sensor elements have the same or a very similar design, it is possible, in addition to checking the correct functioning of the first sensor elements by the safety sensor elements, to detect design-related changes in the signals from the first sensor elements, since said changes in the signals occur in the same way in both sensor elements.

Such design-related changes in the signals can be caused, for example, by a temperature dependence of the course of the signal from the sensor elements, depending on the weight force acting thereon or caused by the influence of distortions on the sensor elements, for example if both sensor elements are arranged on a crease in the vehicle seat.

Signals from the first sensor elements that systematically fluctuate very considerably can then, for example, easily be distinguished from interference-related oscillations in the signals from the sensor elements if the fluctuations in the signals from the first sensor elements and safety sensor elements occur simultaneously.

In the method according to the invention for detecting the occupation of a seat in a motor vehicle, first sensor elements of a first sensor seat mat, flatly arranged on a vehicle seat, transmit to an evaluating unit in the form of sensor signals the information relating to a weight force acting on the vehicle seat. The evaluating unit subsequently evaluates the first sensor signals in such detail that a classification of the object or of the person ensues by the weight on the vehicle seat.

The result of the classification is subsequently transmitted to a control unit which adapts the triggering parameters of an occupant protection unit, for example of an airbag, to the seat occupation that has been detected only if, using signals from a second sensor seat mat, comprising safety sensor elements, the first classification effected by the evaluating unit using the first sensor signals is confirmed by the evaluating unit through a second classification using the second sensor signals from the safety sensor elements.

As was already described above, such an only partial adaptation of the triggering parameters of the occupant restraining unit to the result of the weight classification of the device according to the invention is also an indication of a defective first sensor seat mat or a defective second sensor seat mat. Advantageously, the above potential malfunction is transmitted to the vehicle occupant, for example by a warning lamp in the dashboard of the vehicle. The driver can subsequently arrange for the error in the device for detecting the occupation of a seat in his motor vehicle to be rectified by a specialist workshop.

DETAILED DESCRIPTION OF THE INVENTION

Figure 1:
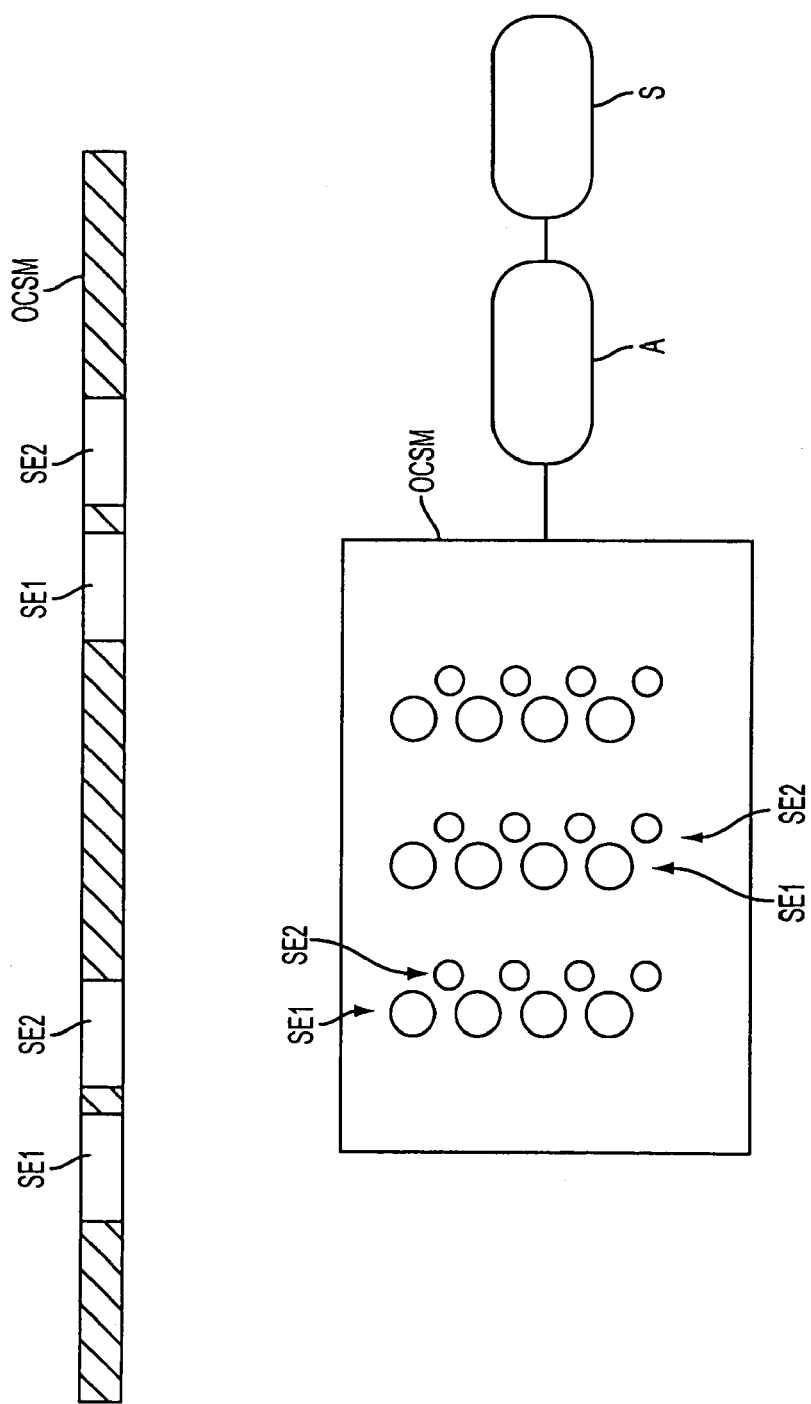
FIG. 1 a cross-section through and a top view onto the surface of a device according to an aspect of the invention, and FIG. 2 a cross-section through and a top view onto the surface of a device according to another aspect of the invention.

The upper part of FIG. 1 shows a cross-section of a sensor seat mat OCSM according to the invention, having sensor elements SE1, wherein safety sensor elements SE2 are arranged adjacently. The lower section of FIG. 1 shows the sensor seat mat OCSM with the first sensor elements SE1 integrated thereon and the adjacent safety sensor elements SE2, likewise the evaluating unit A downstream and the control unit of the vehicle occupant protection unit.

According to an aspect of the invention, an object having an adequate two-dimensional expanse simultaneously exerts a comparatively large weight force on a first sensor element SE1 and on a safety sensor element SE2. The signals from a first sensor element SE1 and the signals from a safety sensor element SE2 are transmitted to the evaluating unit A. By means of a circuit component or of a circuit component in combination with the corresponding software, the two signals are then compared with each other. If the signals from the first sensor element (SE1) and those from the safety sensor element (SE2) are not consistent with each other, this is then reported by the evaluating unit A to the control unit S of the occupant protection unit, for example, of the airbag. The control unit S now has to make the decision as to whether it should ignore or only partly consider the result in its decision to trigger the airbag.

Where there is persistent interference in the sensor signals from safety elements SE2 and/or of the signals from the first sensor elements SE1, the control unit S issues a control command for a warning to be sent to the passenger, said warning being in the form of an airbag warning light. The warning light alerts the vehicle keeper to the fact that the occupant protection system is not available in its full functionality, thus prompting him to consult an authorized workshop immediately in order for the damage to be repaired.

Figure 2:
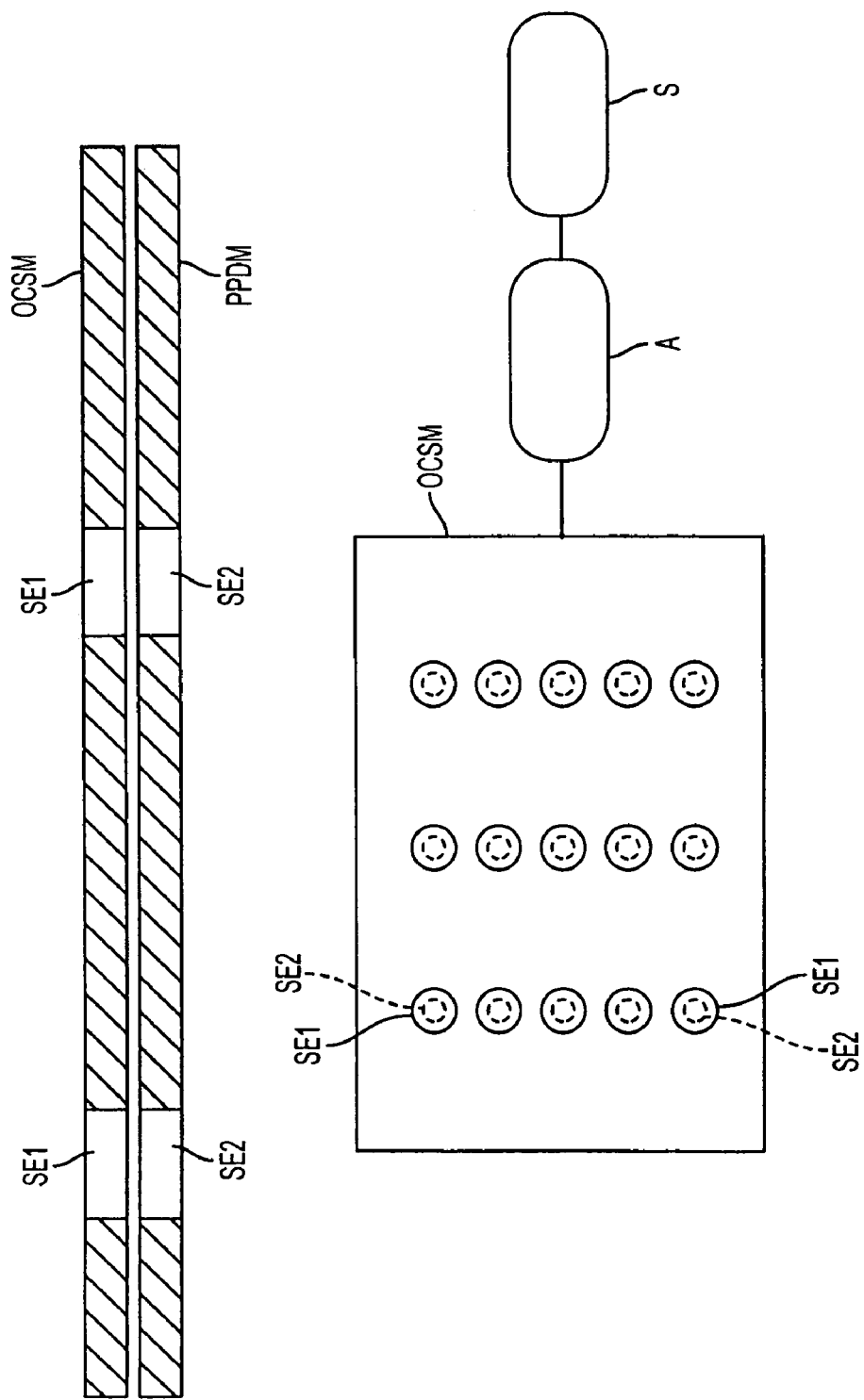

FIG. 2 shows a further aspect of the device according to the invention. The upper section of FIG. 2 shows a cross-section of two sensor seat mats OCSM and PPDM arranged one above the other. The first sensor seat mat OCSM is preferably bonded to the second sensor seat mat PPDM, with the result that each first sensor element SE1 comes to rest on the vehicle seat over a safety element SE2.

The lower part of FIG. 2 shows a top view of the above arrangement. Here the first sensor elements of the first sensor seat mat OCSM are drawn using unbroken lines and the safety sensor elements SE2 of the second sensor seat mat PPDM located below said elements are shown using broken lines, however. Similar marks are again used for the evaluating unit A downstream and also for the control unit S of the occupant protection unit.

As shown in the embodiment in FIG. 1, one safety sensor element is assigned to each sensor element of the first sensor seat mat OCSM. The disclosed arrangement of sensor elements disposed one on top of the other has the advantage that the same weight force always acts both on a first sensor element SE1 and on a safety sensor element SE2 as soon as there is a weight bearing on the first sensor seat mat OCSM.

As in the embodiment shown in FIG. 1, the sensor signals from the first sensor elements SE1 are each compared with those from the safety sensor elements SE2 in the evaluating unit A downstream. Only if the readings in a previously specified tolerance range are consistent with one another is the weight classification that has been confirmed for the weight bearing on the seat surface subsequently used by the control unit S of the occupant protection system to adapt the triggering parameters of the airbag.

The invention claimed is:

1. A device for detecting whether a seat in a motor vehicle is occupied, comprising:
   first sensor elements flatly arranged on a seat surface of a vehicle seat for detecting whether the seat is occupied, wherein first sensor signals from the first sensor elements are dependent on a weight force applied to the first sensor elements;
   an evaluation unit downstream from the first sensor elements for evaluating the first sensor signals;
   a control unit downstream from the evaluation unit for adapting triggering parameters of an occupant restraining unit depending on the evaluated first sensor signals; and
   safety sensor elements flatly arranged on the seat surface of the vehicle seat and connected to the evaluation unit for checking the functionality of the first sensor elements, wherein
   safety sensor signals from the safety sensor elements are dependent on the weight force applied thereto and the functionality of the device can be determined by the evaluation unit by comparing the first sensor signals with the safety sensor signals.

2. A device according to claim 1, wherein a design of the first sensor elements and that of the safety sensor elements is identical.

3. A device according to claim 1, wherein
   the first sensor elements are arranged inside a first sensor seat mat and the safety sensor elements are flatly arranged on the vehicle seat inside a second sensor seat mat above or beneath the first sensor seat mat.

4. A device according to claim 3, wherein
   the second sensor seat mat is firmly connected to the first sensor seat mat.

5. A device according to claim 4, wherein
   the second sensor seat mat is bonded to the first sensor seat mat.

6. A device according to claim 1, wherein
   the safety sensor elements are integrally arranged on the first sensor seat mat.

7. A device according to claim 1, wherein
   at least one safety sensor element is assigned to at least one first sensor element for checking the functionality of the at least one first sensor element.

8. A device according to claim 7, wherein precisely one safety sensor element is assigned precisely to one first sensor element to check for correct functioning of said first sensor element.

9. A method for detecting whether a seat in a motor vehicle is occupied, comprising:
   converting a weight force acting on a vehicle seat which has first sensor elements of a first sensor seat mat flatly arranged thereon into first sensor signals;
   transmitting the first sensor signals to an evaluation unit;
   converting the weight force acting on the vehicle seat detecting by safety sensor elements of a second sensor seat mat flatly arranged on the vehicle seat into safety sensor signals;
   transmitting the safety sensor signals to the evaluation, where the evaluation unit evaluates the first sensor signals and detects occupation of the seat based on the evaluation; and
   adapting triggering parameters of an occupant protection unit to the detected seat occupation only if the safety sensor elements of the second sensor seat mat confirm the first sensor signals detected in the evaluation unit with safety sensor signals.

10. A method according to claim 9, wherein the control unit emits a warning signal if the detected seat occupation detected by the first sensor seat mat is not confirmed by the evaluated second sensor signals of the second sensor seat mat.

* * * * *